United States Patent [19]

Dagn

[11] 4,328,837
[45] May 11, 1982

[54] APPARATUS FOR MOUNTING A PIPE IN AN OPENING IN A PRESSURE VESSEL WALL

[76] Inventor: Josef Dagn, Schwendter-Str. 231a, 6345 Kössen (Tirol), Austria

[21] Appl. No.: 131,463

[22] Filed: Mar. 18, 1980

[30] Foreign Application Priority Data

Mar. 26, 1979 [AT] Austria ................................ 2210/79

[51] Int. Cl.$^3$ ............................................. F16L 55/10
[52] U.S. Cl. ........................................ 138/89; 138/90
[58] Field of Search ................................... 138/89, 90

[56] References Cited

U.S. PATENT DOCUMENTS

| | | | |
|---|---|---|---|
| 2,155,491 | 4/1939 | Jacobs | 138/89 |
| 2,315,538 | 4/1943 | Moeller | 138/89 |
| 2,607,370 | 8/1952 | Anderson | 138/90 |
| 3,006,680 | 10/1961 | Gregory | 138/90 |

FOREIGN PATENT DOCUMENTS

| | | | |
|---|---|---|---|
| 382456 | 10/1923 | Fed. Rep. of Germany | 138/89 |
| 1045936 | 12/1953 | France | 138/89 |
| 1513424 | 1/1968 | France | 138/89 |
| 161797 | 5/1933 | Switzerland | 138/89 |
| 859857 | 1/1961 | United Kingdom | 138/89 |

*Primary Examiner*—Willis Little
*Attorney, Agent, or Firm*—Cushman, Darby & Cushman

[57] ABSTRACT

To facilitate the testing of a fluid-containing system while the system is pressurized, using a method which includes stabbing a testing apparatus into an access opening of the system and sealingly securing the apparatus in the opening, the invention provides an improved testing apparatus which can be easily removably sealingly mounted in a sizeable range of opening diameters, without a need for repetitive tentative installation, removal adjustment and reinstallation steps, and without placing unbalanced bending stress on the perimeter of the opening. On this apparatus, the plug-like closure body is conically tapered, so that it can form a ring of initial engagement with the inner perimeter of the access opening over a wide range of access opening diameters by making such engagement at a variable level along the length of the plug-like closure body; an adjustment feature is provided on the outside, so that the degree of compression can be adjusted from the outside while the device remains lightly pressed into the access opening, preventing the escape of vapor, fumes, boiling liquid, or the like; and final installation is accomplished by pivotally pressing down two diametrically opposed eccentric levers, thus counter-balancing the torquing moment each lever exerts on the rim of the access opening.

1 Claim, 1 Drawing Figure

U.S. Patent    May 11, 1982    4,328,837
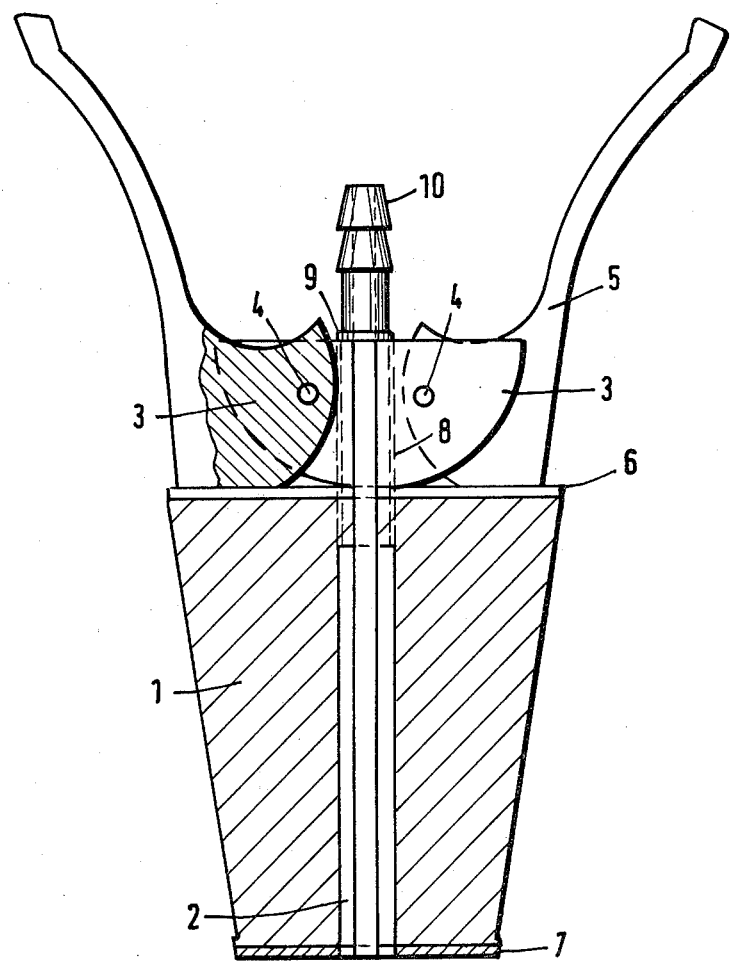

APPARATUS FOR MOUNTING A PIPE IN AN OPENING IN A PRESSURE VESSEL WALL

FIELD OF THE INVENTION

The invention relates to a pressure and vacuum closing device consisting of a flexible closing element to be introduced into the opening that is to be closed and which may be pressed against the walls, through which a pipe is conducted.

BACKGROUND OF THE INVENTION

Closing devices known hitherto with pipe-shaped closing elements filling the inside diameter of openings of containers or pipes do not permit an equalization of the tolerances of the inside diameter of the openings as they occur in the production of pipes or containers. It is obvious that such closures cannot withstand an unbalanced pressure occuring, be that now an excess pressure inside the pipe or container or an underpressure therein, so that said closures, particularly in case of suddenly occuring pressure differences, are forced out of the openings. Closing devices in the case of which a sealing ring is pressed against the wall of the opening by two discs moveable against each other by means of a screw, are also known.

The disadvantage of these closing devices lies in the great expenditure of force and time which is required for the tightening of this screw, mostly by means of a wing nut or by means of a wrench. In the case of special work, especially for example, in the case of pipe testing, it is necessary, however, to have a pressure-resistant closure by which a fluid pressure agent, for example water, air, gas or the like, may be quickly introduced or drawn off.

SUMMARY OF THE INVENTION

In order to avoid any leakage occurring in the case of known closures caused by yielding of the pressure element (for example, a wedge, screw or lever), in the case of an increase of pressure, reduction of pressure, shock, careless handling, and the like, throughbored pipe is provided with a hose connecting part be provided at its upper third with a thread and at its lower side be connected with a closing plate, and that on the thread a bearing block be arranged so as to be adjustable in height by means of a bore having a thread, which at its two sides has a moveable eccentric lever which is supported by an upper closing plate, whereby by lifting the bearing block by means of the eccentric lever, the conical closing plug may be axially shortened and radially expanded.

One advantage lies in the fact that by a single motion of the user's hand, the bearing block may be shifted in relation to the closing plate so that the closure is quickly secured or released by the triggering of the lever.

Another advantage lies in the possibility of adjusting the bearing block as to height, for with that adjustment the closing device may be adapted to openings of variable size even before insertion and clamping. Therefore, it is possible with a small set of different sized ones of the closing devices according to the invention to stopper openings of many diameters.

Also the problem of overcoming of the tension of the nut or screw that is to be tightened and as used in the case of the known closing devices, is eliminated.

Through the development of the eccentric levers, one will also prevent that the feeding hose for the pipe or the fingers of the person handling the device, would become jammed in the equipment.

The bearing block with its semi-circularly arched side down rests on the closing plate and thus does not prevent the motions of the eccentric levers, is also important.

It is an advantage for facilitating universal use of the device of the invention, that the parts be made from corrosion resistant material.

BRIEF DESCRIPTION OF THE DRAWING

The invention will be explained in more detail on the basis of the drawing which shows a schematic side elevational view of the device, with portions in longitudinal section.

As the FIGURE shows, the device according to the invention includes a conical closing plug 1, which is enclosed by an upper and lower closing plate (6 and 7). The pipe 2 is firmly connected with the closing plate 7, has a thread 9 in its upper third and has a connecting element (10) for a hose at its upper end. The bearing block 3 is seated rotatably on the thread 9. The joints 4 of the eccentric lever 5 are attached to the bores 4 of the bearing block. These eccentric levers are supported by the upper closing plate 6.

Depending on the inside diameter of the opening into which the device is to be received, first of all the distance of the two closing plates 6 and 7 is adjusted by twisting the bearing block 3 on the thread 8 of the pipe 2. Then the plug is introduced into the closure opening and the pipe 2 with the bearing block 3 is lifted by pushing down the eccentric lever 5, whereby the closing plug 1 is pressed against the peripheral surface of the opening as well as against the pipe passage of the upper closing plate. Thus a pressure resistant and firm closure of the pipe opening will be ensured.

In the drawing there is shown a device or an apparatus for mounting a pipe in an opening in a pressure vessel wall. This device is shown including a plug-like closure body 1 of elastic material, having a perimetrical sidewall extending, tapering fashion, between an outer end and an inner end. An inner closing plate 7 is disposed against the inner end of the plug-like closure body. An outer closing plate 6 is disposed against the outer end of the plug-like closure body. A pipe 2 is provided having a throughbore extending between an inner end thereof and an outer end. This pipe is connected adjacent the inner end thereof to the inner closing plate 7 so as to be open through the inner end of the pipe. The pipe extends axially completely through the plug-like closure body and the outer closing plate and has its outer end disposed substantially axially outwardly beyond where the pipe emerges axially outwardly of the outer closing plate, thus forming an axially outwardly extending portion of the pipe, which portion includes the outer end of the pipe.

A connector element means 10 is formed on the pipe adjacent said outer end thereof. A band of threading 8 is formed externally on the pipe between a level intermediate said ends of the plug-like closure body, and said connector element means. A bearing block 3 is threadably mounted on the extending portion of said pipe and normally an inner end surface in contact with said outer closing plate from the axially outer side of said outer closing plate, so that when said bearing block is reversibly threaded inwardly, the plug-like closure body 1 is reversibly axially compressed and radially expanded, for adjusting the plug-like closure body to tightly and securely fit in a pressure vessel wall opening, even though such opening may vary in width from a given nominal size.

An eccentric lever means 5 is pivotally secured to said bearing block 3 and has respective cam means positioned for confrontingly engaging relation with the outer closing plate. The eccentric lever means is thereby arranged to be reversibly pivoted in one respective direction to more forcibly engage the outer closing plate 6 toward the inner closing plate 7, and to thus additionally axially compress and radially expand the plug-like closure body 1 beyond such compression and expansion as may then be being provided by the relative degree of inward threading of the bearing block 3 on the band of threading 8. This movement thus reversibly takes away from the bearing block 3 a direct responsibility for providing the desired extent of such axial compression and radial expansion of said plug-like closure body.

The eccentric lever means 5 is constituted by at least one lever 5 and the respective can means thereof preferably includes a cam having a cam surface provided with a second, more prominent region disposed angularly between a first region of lesser prominence and a third region of intermediate prominence, so that as this lever is pivoted in said one direction a stable, higher amount of axial compression and radial expansion of the plug-like closure body is achieved once the cam portion of intermediate prominence confronts the outer closing plate than when the cam portion of lesser prominence confronted said outer closing plate.

Preferably, the eccentric lever means is further constituted by a second such lever 5, paired in diametrically opposed relation to the first-described such lever relative to the pipe.

The bearing block, relative to said apparatus as viewed in said elevation, preferably is of generally axially inwardly convex semi-circular profile. In the prior art, a large number of pieces was always required for the most diverse inside diameters, in the case of the known closing devices. With the device according to the invention, it is possible, because of the adjustability to considerably decrease the number of pieces in the case of the most diverse fields of application. Likewise the expenditure of power and time is decreased in the case of the application, which offers universal possibilities for the invention, for example, in the case of repair and checking of boiler installations, motor vehicle radiators and systems of pipelines.

I claim:

1. Apparatus for mounting a pipe in an opening in a pressure vessel wall, comprising:
   a plug-like closure body of elastic material, having a perimetrical sidewall extending, frusto-conically tapering fashion, between an outer end and an inner end;
   an inner closing plate, said inner closing plate being disposed against said inner end of said plug-like closure body;
   an outer closing plate, said outer closing plate being disposed against said outer end of said plug-like closure body;
   a pipe having a throughbore extending between an inner end thereof and an outer end thereof;
   said pipe being connected adjacent said inner end thereof to said inner closing plate so as to be open through said inner end plate of said pipe;
   said pipe extending axially completely through said plug-like closure body and said outer closing plate and having said outer end thereof disposed substantially axially outwardly beyond where said pipe emerges axially outwardly of said outer closing plate, thus forming an axially outwardly extending portion of said pipe, which portion includes said outer end of said pipe;
   tube connector element means formed on said pipe adjacent said outer end thereof;
   a band of threading formed externally on said pipe between a level intermediate said ends of said plug-like closure body, and said tube connector element means;
   a bearing block threadably mounted on said extending portion of said pipe and normally having an inner end surface adjacent said outer closing plate from the axially outer side of said outer closing plate, so that when said bearing block is reversibly threaded inwardly, said plug-like closure body may be reversibly axially compressed and radially expanded to a desired extent, for adjusting the plug-like closure body to tightly and securely fit in a pressure vessel wall opening, even though such opening may vary in width from a given nominal size;
   a pair of diametrically opposed eccentric lever means pivotally secured to said bearing block and having respective cam means positioned for confrontingly engaging relation with said outer closing plate, said eccentric lever means each being thereby arranged to be reversibly pivoted in one respective direction to forcibly engage the outer closing plate toward the inner closing plate, thus axially compress and radially expand the plug-like closure body beyond such compression and expansion as may then be being provided by the relative degree of inward threading of the bearing block on said band of threading, and thus reversibly take away from the bearing block a direct responsibility for providing the desired extent of such axial compression and radial expansion of said plug-like closure body.

* * * * *